United States Patent [19]

Blaser et al.

[11] Patent Number: 5,672,235

[45] Date of Patent: Sep. 30, 1997

[54] PLASTIC FILM STRIPPER APPARATUS AND METHOD FOR HEATED SEALING APPARATUS

[75] Inventors: Giles R. Blaser, Green Bay; William J. Greely, Sobieski, both of Wis.; Shaughn V. Hanley, Iron Mountain, Mich.

[73] Assignee: Amplas, Inc., Green Bay, Wis.

[21] Appl. No.: 539,807

[22] Filed: Oct. 5, 1995

[51] Int. Cl.$^6$ .................. B32B 31/18; B31B 37/60; B31B 49/04

[52] U.S. Cl. .................. 156/497; 156/498; 156/515; 493/203; 493/204

[58] Field of Search .................. 493/203, 204; 156/247, 251, 444, 497, 515, 544, 498; 406/86, 87, 88, 157; 271/195, 309; 165/177

[56] References Cited

U.S. PATENT DOCUMENTS

| | | |
|---|---|---|
| 4,573,955 | 3/1986 | Mory et al. .................. 493/204 |
| 5,074,735 | 12/1991 | Stock .................. 414/27 |
| 5,468,333 | 11/1995 | Mundus et al. .................. 156/537 |

*Primary Examiner*—James Engel
*Assistant Examiner*—J. A. Lorengo
*Attorney, Agent, or Firm*—Andrus, Sceales, Starke & Sawall

[57] ABSTRACT

A sideweld bag making has a reciprocating seal bar and a roller. Drive rolls upstream of the seal bar moves a web in steps over the roller and seal bar seals and severs the web to form bags. A cooling plate between the drive rolls and sealing bar includes a web strip and control air stream tube directs a special stream to engage the raising seal bar to strip the severed web therefrom and to engage the leading web edge as it moves through the seal bar unit. The stream source has closely spaced openings to form the stream; the width and character of which is controllable for selective web engagement. A second air tube is located beneath the web and directs the air stream over the sealing roller to further release the web during the movement of the web.

16 Claims, 4 Drawing Sheets

PLASTIC FILM STRIPPER APPARATUS AND METHOD FOR HEATED SEALING APPARATUS

BACKGROUND OF THE INVENTION

This invention relates to a plastic film stripping apparatus and method thereof for a heated sealing apparatus and particularly for stripping of a plastic web passing through a seal bar unit in a bag making machine and the like.

Plastic bags and like individual plastic articles are formed bypassing a film web of a plastic member through a bag making machine. The film web is passed through the bag making machine as a continuous elongated plastic member from a suitable supply such as a roll of the plastic. The plastic is generally folded to form the bag with at least one edge being sealed in spaced locations in accordance with the bag length. A side weld bag forming machine receives a folded plastic web having an edge opening. The web is passed through the bag making machine which includes a seal bar unit having a vertically reciprocating heated seal bar, the lower end of which is generally tapered to not only seal the plastic film but also severs the sealed plastic area and thereby separates a bag member from the end of the folded plastic web.

The heated seal bar severs and seals the plastic bag along the width of the folded plastic as a result of high temperatures created at the tip of the seal bar unit. Draw rolls are mounted upstream of the seal bar unit and actuated in timed relation with the seal bar unit to feed the web into the seal bar unit in a stepped intermittent relationship during which the seal bar unit is in a dwell period. The formed bags may be advantageously passed to an output conveyor and therefrom to a wicketing and stacking system or assembly such as shown, for example in U.S. Pat. No. 5,074,735 which issued to David Stock on Dec. 24, 1991 and is assigned to a common assignee with this invention.

In a typical application and apparatus, the vertical reciprocating seal bar engages a Teflon covered sealing roller and clamps the plastic web therebetween for a very short period to seal and sever the plastic web. The draw rolls are mounted in close upstream relation to the seal bar unit. A cooling plate unit is mounted between the reciprocating seal bar and the draw rolls to minimize heat transfer to the draw roll units. As the seal bar is withdrawn, the upstream severed leading edge of the web tends to attach to the seal bar and is raised upwardly with it. If the draw rolls are actuated with the leading edge raised, the film can curl upwardly resulting in a poor bag placement for subsequent stacking of the bags. A well-known method of eliminating or minimizing this effect is to provide a plurality of air fingers located immediately above the plane of the film path and below the level of the film path to generate air flows overlying the film web within the seal bar unit and actuated to hold the plastic web in a given plane. In such structures, the draw rolls which are close-spaced to the system are grooved along the longitudinal length thereof to accept the plurality of air fingers in appropriate location with respect to the seal bar unit. This provides an increased cost in the system and also may result in a less than optimal movement of the web. Thus, the grooved draw rolls have less traction than a continuous draw roll and generally degrade the desired accurate tracking of the web through the machine and particularly the seal bar unit. The draw roll grooves, particularly with the wide air fingers, tend to induce web direction and wrinkles which are critical at the higher speeds and with lighter gauge films. Although the air fingers have been found to satisfactorily hold the web in general relationship and prevent curling of the film during the advance, the recent development of even higher speed movement of the web and the seal bar unit to rapidly form the series of bags has resulted in less than optimal operation of the bag forming machine. Thus, the seal bar tends to lift the web and with the higher speed production rates desired with today's bag machines, optimal movement of the web has not been maintained. An alternative method is the use of mechanical strippers at the draw rolls. The mechanical strippers are significantly thinner than the air tubes and generally ¼ of the size. The thin mechanical stripper minimizes the adverse effect of the grooves in the draw rolls. The total mechanical system is not as effective at higher speeds. Further, in a side weld bag machine, the web is folded with a closed longitudinal edge to one side and an offset laterally extended and single layer web fold or lip at the opposite edge. The folded web is also generally formed with a gusset in the folded edge of the web. The folded web is then welded at successive lengths to form welded sides of each of the bags. The thin lip tends to fold back under the high acceleration forces generated in high speed bag machines and welds to itself. This results in what is generally called "dog ears" which not only makes an unsightly bag but also a bag which is difficult for the end user to load a product on an automatic loading machine.

Thus, there is a need in the art of rapid high speed severing of plastic film and the like to form a series of articles with a positive and reliable system and method to separate the severed plastic web or free end of the plastic web from the seal bar unit and particularly the very hot end thereof. The solution, of course, should provide a very cost-effective machine or separating mechanism without further adverse effect on the tracking of the web into the seal bar unit.

SUMMARY OF THE PRESENT INVENTION

Generally, in accordance with the teaching of the present invention, a special air jet system is mounted immediately upstream of a sealing member and creates a jet stream directed onto the lower end of the sealing member and the leading edge of the film to establish a fluid air stream specifically blowing the upstream leading edge of the film web away from the sealing member.

The present invention is hereinafter described in relation to known seal bar units for purposes of disclosing a preferred embodiment, and in which, as noted above, the seal bar unit not only seals the plastic but simultaneously functions as a severing means. With respect to bag machines, a seal bar unit therefore provides a generic definition of a member having a rather sharp end which can effect a seal of a web and simultaneously sever the web in the sealed area or only seal the web with a subsequent unit for severing the sealed web. The subsequent unit could include a similar severing bar unit. The ends of the separate unit may be specially shaped for the respective functions.

The inventors have found that mounting of the stream adjacent to the cooling plate unit in the bag machines provides a simple, cost effective method of forming an air blasting stream for blowing of the leading plastic edge from the seal bar and directing it into a horizontal plane, which permits high speed advance of the film strip at high acceleration forces in accordance with the specification for bag making machines. If the severed plastic edge does not stick to the seal bar, the air blast may not have to engage the bar. The system has the further advantage of eliminating the necessity of the air fingers units and with them the relative large grooves in the draw rolls. The air blast system can be provided at a significant lower cost than the dual finger guide arrangement and the grooved draw rolls, as well as providing a more effective and reliable action. Further, the draw rolls may be formed as more continuous surface member maintaining more optimal traction on the film strip and optimal feeding into the seal bar unit. Although mechanical guide members may be provided within grooved rollers, the grooves are significantly narrower than with the air fingers. Further, the guide members may not be necessary throughout the total width of the draw rolls, but located to produce optimum feed of the rolls.

In a particularly preferred construction, a cooling unit plate unit is formed, generally as known structures, with a generally flat plate member having a plurality of spaced cooling tubes attached to the back face of the plate. The plate is mounted in accordance with conventional practice in a generally vertical orientation between the seal bar and the draw rolls, with the plate spaced slightly from the seal bar. The lower end of the plate is formed with a downwardly extended lip which extends into general alignment with the bottom tip portion of the seal bar and locates the lip in close relation to the plane of the web. In accordance a preferred construction of the present invention, an air jet tube is secured to the lower end of the plate just above the lip. Nozzles are formed through the plate and the tube to establish an substantially essentially continuous air jet stream directed downwardly along the angle of the angled lip and thus to engage the seal of the tip portion of the seal bar and the upper surface of the film as the seal bar moves upwardly. The stream is of a sufficient force to drive the web in the horizontal plane of the film web path and continues during the draw roll motion until the developing bag is in a stabilized position. The stabilized position may be assisted by air stream created downstream of the seal bar. The above action allows the next uninterrupted movement of the web by the draw rolls and onto the transfer conveyor or other receiving device.

Thus, the present invention may use a standard cooling plate with the appropriate location of the cooling tubes for the addition of the air tube. The air tube and the forming of the nozzles is significantly less expensive than the forming of the air fingers and grooved rolls and thus provides not only highly improved operating system but one at a significantly lesser cost and a more optimally operated high speed plastic severing system, particularly adapted for forming of folded plastic members and particularly plastic bags.

Although the integrated unit is obviously most desirable, a separate air system can be provided independent of the cooling plate and appropriately interposed between the seal bar unit and the draw roll unit for forming an air blast across the seal bar. A second air stream supply may be located below the film web line plane to further aid in delivery of the web and provide air flow around the seal roller. In addition, to the cooling provided by the cooling plate, a separate cooling system might be provided to the air source, or an auxiliary source provided upstream of the connection to the cooling plate. The cooling of the air stream, however, is not necessary. These and other variations will be obvious to those skilled in the art.

In summary, the present invention provides a cost effective and improved apparatus and method for removing the leading edge of plastic web from a heating member as the member is lifted from the web.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DESCRIPTION OF THE ILLUSTRATED EMBODIMENT

Figures 1, 1A, 6:
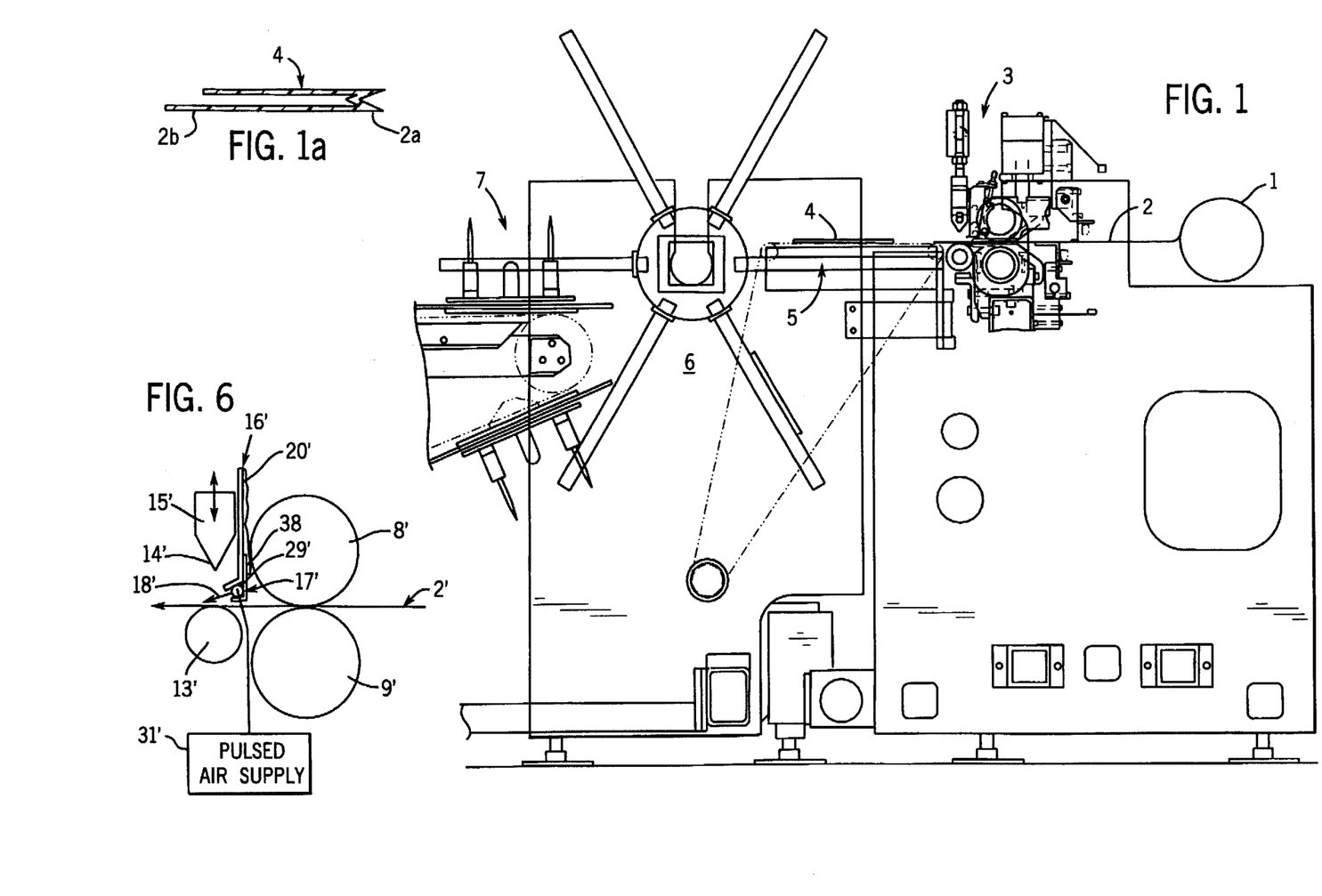
FIG. 1 is a simplified elevational view of a bag making machine incorporating the teaching of the present invention.
FIG. 1a is a cross-sectional view of the plastic web processed by the machine to form plastic bags.
FIG. 6 is a simplified schematic illustration of an alternate embodiment incorporating a separate air tube for establishing a blast of air across the web within a seal bar unit.

Referring to FIG. 1, a plastic bag forming line is illustrated, generally with a sideweld bag machine. The line consists of a film supply 1, such as a plastic roll, to provide a continuous free plastic web film web 2. The film web 2 is shown as a folded film having a closed edge 2a formed as a gusseted end and an opposite edge with one fold layer extended laterally from the other to define a single layer lip 26. A seal bar unit 3 is constructed grasp and move the film web 2 through the seal bar unit 3 in an intermittent or stepped sequence, during which the leading portion of the film web 2 is severed into predetermined lengths to form plastic bags 4. The web 2 is passed through the seal bar unit 3 with the prior leading edge transferred onto a conveyor 5. The web 2 is then again severed within the seal bar unit 3 to form the bag 4 which is separated from the severed leading edge by the conveyor 5.

In a typical sideweld bag formed from a web as shown in FIG. 1a, the bag generally has a width of approximately 9½ inches to a maximum of 14 inches and a length from the lip to the gusset which varies between 8 to 28 inches. In most instances, the lip 2b extends approximately 1½ inches. The lip 2b includes stacking holes, not shown. The closed gusset 2a will generally vary with thickness and characteristic of the plastic material. Maintaining of the film web with the lip 2b and the gusset 2a moving in the plane of the web is significant and maintaining thereof is more difficult as the cycle speed increases. Thus, the lip 2b may tend to fold back on itself and weld to itself, while the gusset may tend to float upwardly. In the illustrated embodiment of the invention, a wicketing unit 6 is operable to pick up the bags 4 from the conveyor 5 and transfer them to a stacking unit 7 including individual wicket pin unit 7 aligned with the holes, not shown, in lip 2b. The wicketing unit 6 and stacking unit 7 are constructed in any suitable well-known device. A satisfactory unit being shown in the previously identified U.S. Pat. No. 5,074,735 to David Stock.

Figure 2:
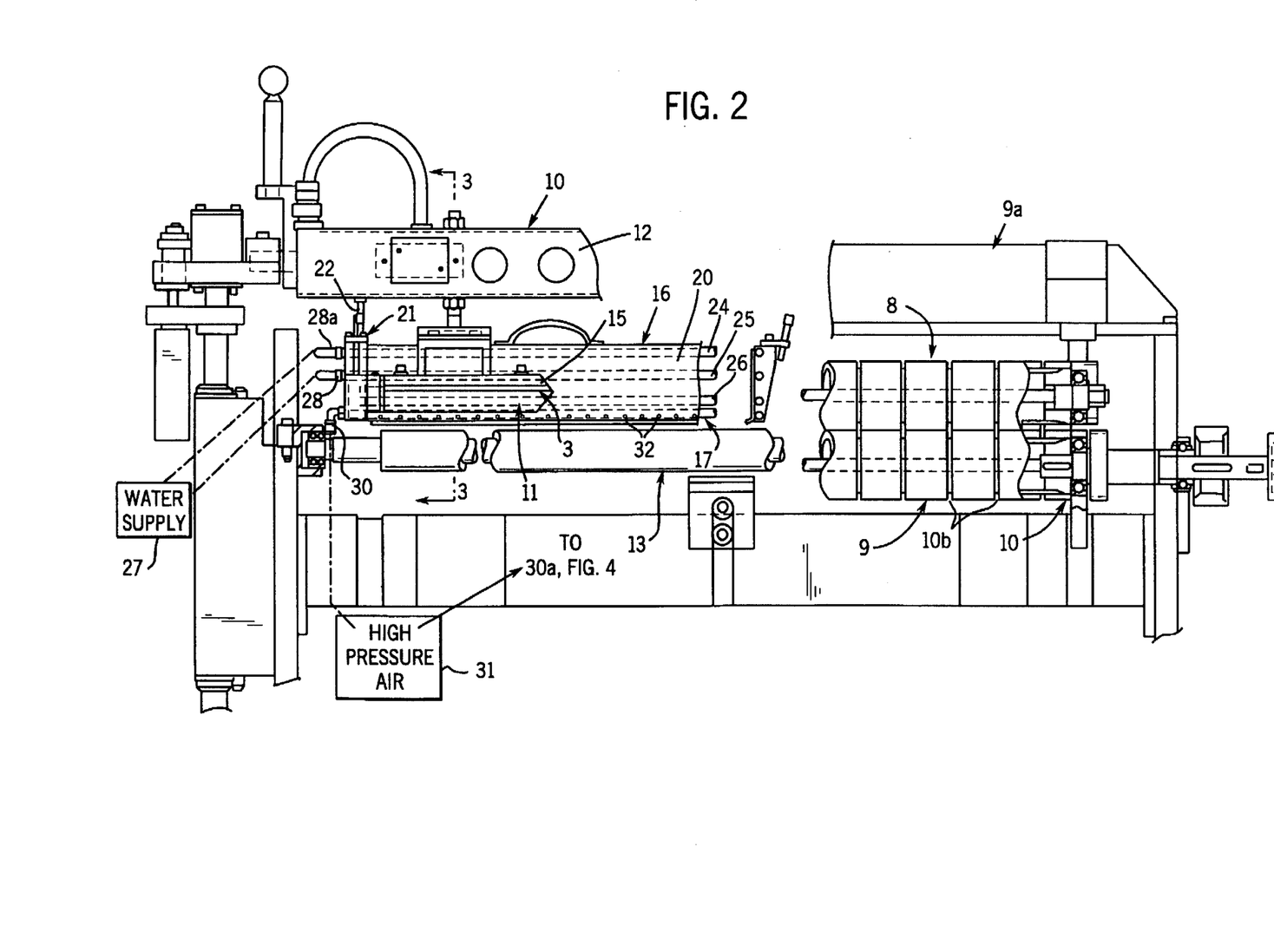
FIG. 2 is an enlarged front elevational view of a seal bar unit with parts broken away to illustrate the several components of the seal bar unit as shown in FIG. 1.
Figure 3:
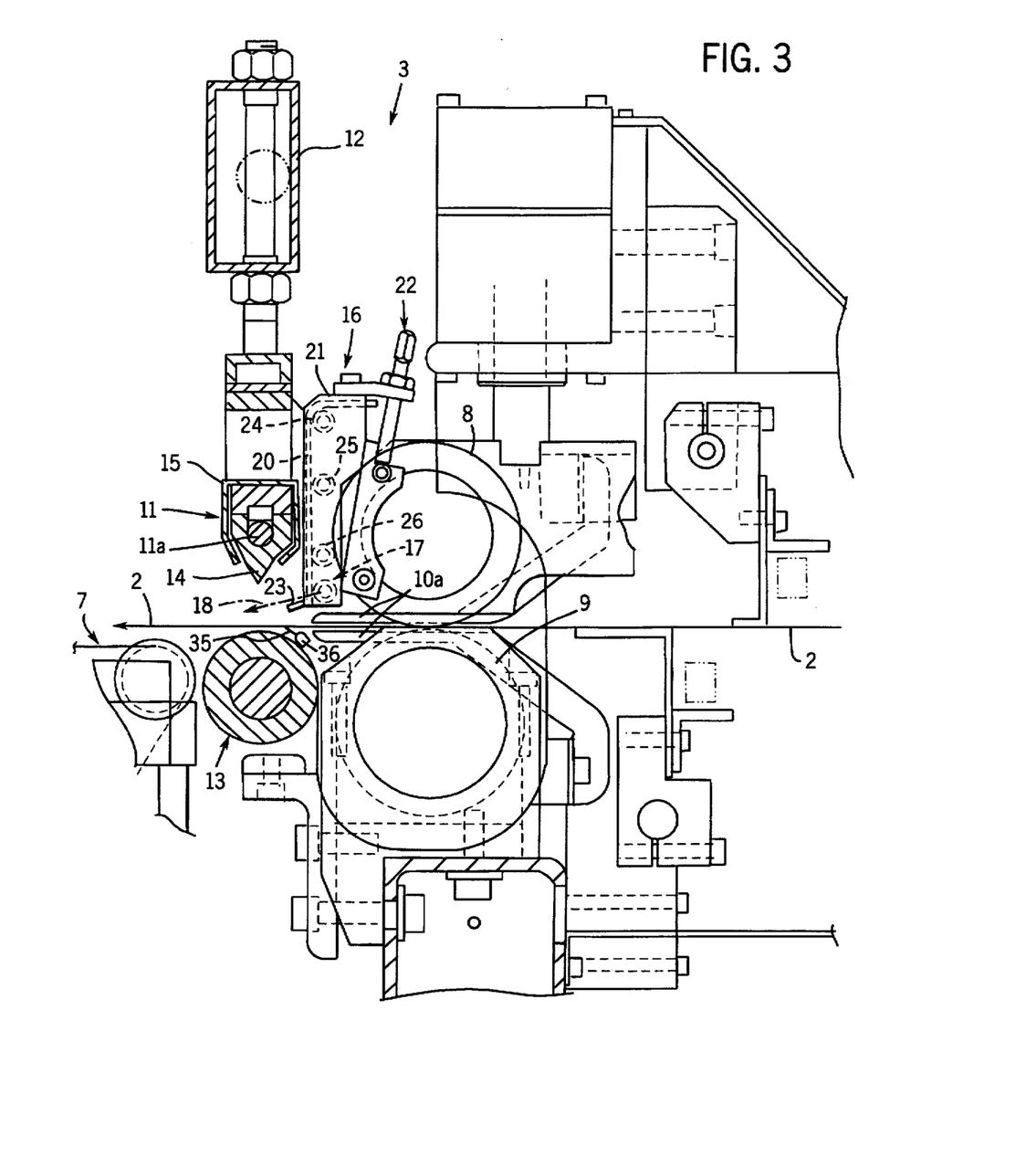
FIG. 3 is an enlarged sectional view taken generally on line 3—3 of seal bar unit of FIG. 2.

Referring particularly to FIGS. 2 and 3, a preferred construction of the sealed bar unit 3 is illustrated. The seal bar unit 3 includes a pair of vertically stacked draw rolls 8 and 9 suitably mounted within a supporting frame structure 10. A suitable drive system 10 is coupled to the draw roll and establishes an intermittent drive system including a web feed period, moving the web 2 into unit 3, and a dwell period during which the unit 3 operates to seal and sever the web 2.

In the illustrated embodiment, known thin mechanical stripper members 10a are interposed between the drive rolls 8 and 9. The stripper members are straight, thin plates supported between the drive rolls 8 and 9 and extended upwardly within thin grooves 10b between roll segments. The stripper members 10a stabilize the web 2 moving through the feed system of the seal bar unit 3. In accordance with the illustrated embodiment, the stripper members 10a may be only provided within selected spaced portions of the drive rolls 8 and 9, as shown in FIG. 2. For example, in a prototype machine, the ends of the web were not properly tracking the web in relationship to the central portion. The drive rolls are conventionally formed of individual roll segments permitting the assembly with or without mechanical stripper members or fingers. With reference to FIG. 3, the stripper member 10a is retained from the central portion and retained between the last five roll segments in the end portions of the drive rolls 8 and 9. The result was a significant improvement in the tracking and movement of the web into the seal bar unit. The mechanical stripper members 10a are substantially thinner than the air finger units of the prior art, and do not severely restrict the traction force of the drive rolls 8 and 9. Further, under certain conditions, stripper members may be even more restricted and in the extreme eliminated.

The operative seal bar assembly includes a seal bar 11 secured to a reciprocating beam 12 supported in the frame structure. The seal bar 11 is located above the plane of the film web 2 passing through the seal bar unit. A rotatable anvil, shown as a plastic covered sealing roller 13, is mounted to the frame structure immediately below the plane of the web 2 and in alignment with the seal bar 11 and forms a short gap through which web 2 passes.

The illustrated bar 11 includes an internal heating element 11a for heating of the bar 11 to a high temperature for sealing of the web layers and also through appropriate construction severing of the web centrally of the sealed area. The seal bar is formed with a conical heated tip 14. An outer stainless steel cover 15, which is spaced slightly from the outer end of tip 14, encloses the bar 11 and concentrates the heat within the outer tip end for rapid and effective sealing and severing of the web. The seal bar 11 is reciprocately mounted and moved in time relation to the draw rolls during the dwell period of the draw rolls to seal and sever the web. The bar is then raised and has its own dwell period during the web feeding period of the draw roll system is established. Upon severing of the web 2, the formed bag 3 is immediately withdrawn by the conveyor unit 5 and moved to spaced relation to the heated seal bar 11.

The structures as described above is well known and disclosed in the prior art and no further description thereof is given.

A cooling plate unit 16 incorporating an air jet unit 17 is mounted between the seal bar 15 and the upper draw roll 8. The illustrated unit 16 generally incorporates a cooling plate structure substantially similar to that heretofore employed in the bag making machine of the present assignee, with modification to incorporate a special air jet unit 17 for establishing a release and positioning air stream 18 directed to positively blow the leading edge of the film web 2 from the sealer bar 15 as the seal bar is raised from the sealing and severing position, and to hold the new leading edge of the web 2 onto the sealing rollers and thus in the plane of movement through the draw rolls and the seal bar unit 3 during the acceleration and high speed movement of the web to place a new bag portion in place.

In addition to the release air stream 18, a pair of blow-down stream sources are provided, shown as tubes 19 and 19 mounted adjacent the upstream end of the seal bar unit 3. The tubes 19 and 19a are vertically spaced and horizontally oriented to establish a pair of vertically spaced air streams for engaging the bags 4 moving onto the conveyor 5. The streams flatten each bag 4 as the bag advances from the draw rolls and through the seal bar unit. Such blow-down tubes are presently used with a pulsed air supply 19b and known in the industry and no further description thereof is given.

Figure 4:
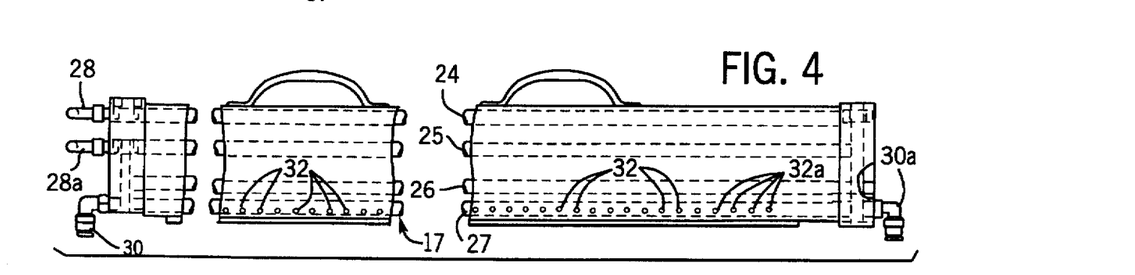
FIG. 4 is an enlarged front view of the combined cooling plate and air jet unit shown in FIGS. 1–3.

Referring particularly to FIGS. 2-4, the cooling plate unit 16 includes a generally flat plate 20 extending preferably completely across the side weld seal bar unit 3 and particularly over the length of the seal bar 15 and sealing roller 13. The plate 20 is secured at the opposite end to the draw roll structure. An adjustable support structure 22 interconnects the unit 16 to the draw support structure for optimum orientation and placement of the cooling plate between the draw roll 8 and the seal bar 15. The plate 20 is shown as typically located with the lower end spaced slightly above the plane of the web 2 and the web guide members 10a interposed between the draw rolls. The bottom-most end of the plate 20 includes a small angled lip 23 which extends downwardly and outwardly toward the working gap between the seal bar 15 and the sealing roller 13, and particularly to form a plane generally directed to pass between the bar tip 14 and the sealing roller 13 just slightly above the plane of the web 2 within the seal line above anvil 13.

Figure 5:
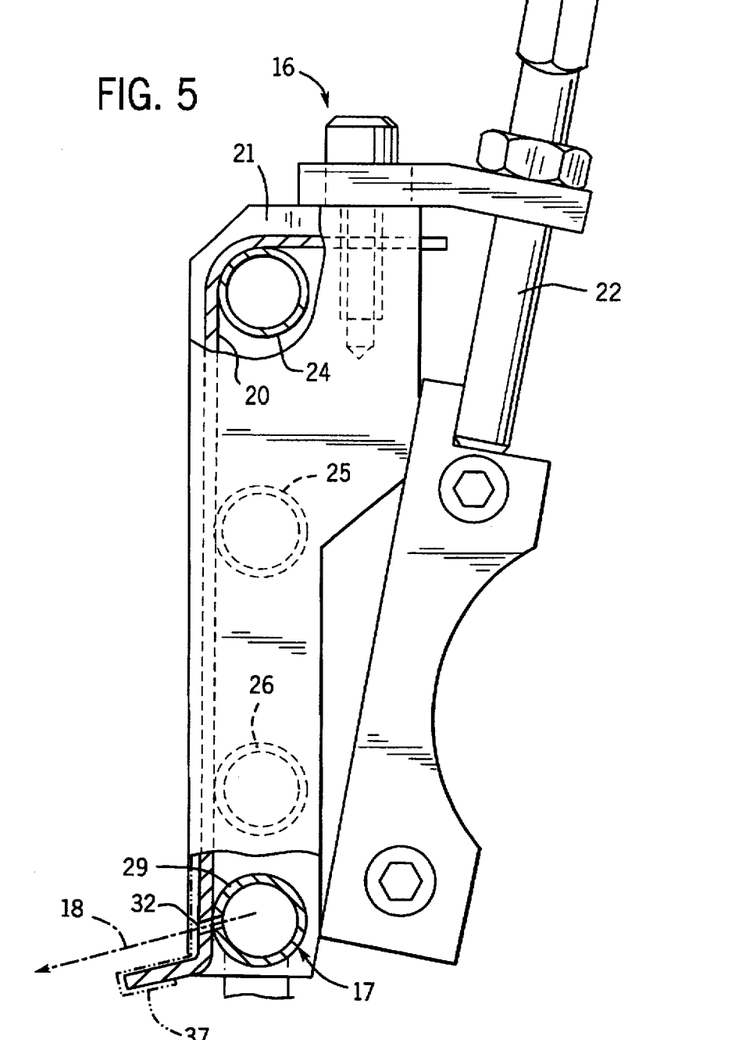
FIG. 5 is a further enlarged sectional view of the cooling plate structure shown in FIGS. 3 and 4.

As shown in FIGS. 3 and 5, three spaced cooling tubes 24, 25 and 26 are secured in intimate and effective heat transfer contact to the back face of the working plate 20. The tubes 24-26 are secured to the plate in vertically spaced relation between the uppermost end and a lower portion which is spaced upwardly from the lip 23. The cooling tubes are connected in accordance with a well known construction to a cooling water supply 27 via supply and discharge connectors 28 and 28a at the one end of the plate 20, shown to the left end of the plate in FIG. 2. The air tube unit 17 includes an air tube 29 secured to the bottom edge of the vertical portion of plate 20 in any suitable manner and thus immediately above the lip 23. The air tube 29 extends throughout the length of the plate 20. The opposite ends of air tube 29 include a respective air inlet couplings or fittings 30 and 30a at the lip end of the plate as viewed in FIG. 2. The fittings 30 and 30a are connected, as diagrammatically illustrated to a pressurized air supply 31, generally in a preferred range at 20 to 40 PSI, for preferably simultaneously supplying of pressurized air to the opposite ends of the tube 29 for rapid forming and terminating of the air stream 18.

During the operation of the bag machine, the air can be passed through the cooling plate to cool the adjacent air and also provide for the air stream 18, as presently described.

The air blasting stream 18 is created during the lift period of the seal bar 15 and preferably subsequently thereto until the new bag portion of the web 2 is developing, such as one half is developed above the transfer conveyor 5. Thus, the activation of the connection of the air supply can be controlled in timed relation to the cycle periods of the seal bar and the draw rolls so as to assure improper feed of the web 2 into a new severing position.

With the increased cycle speeds desired with present day systems and specifications, the dwell and operating cycles of the draw rolls 8–9 and the seal bar 15 are related for activation substantially simultaneously. Thus, as the seal bar 15 has completed its operating cycle to seal and sever the plastic web 2 and initiates upward movement from the sealing roller and web, the draw roll drives is simultaneously activated to accelerate the draw rolls 8 and 9 for movement of the cut leading edge of the severed web forwardly. This can only occur as long as the conveyor 5 moves the severed bag forwardly and the cut web has been released from the seal bar 15.

In order to assist and maintain this optimal machine line operation, the opposite ends of upstream air tube 29 is connected to a pulsed air supply 31 which provides a rapid turn-on of the creation of the air stream 18 and at the other end of the cycle, correspondingly terminates the air stream 18 as rapidly as possible.

The pulsed source or supply 31 connected to the opposite ends of the air stream tube 29 promotes the desired optimal turn-on and turn-off of the stream 18 at the appropriate cycle time.

A pulsed air supply to the standard tube 19 and 19a is correspondingly activated to create a timed pulsed stream applied to the incoming bag, generally in accordance with known bag machine operations.

The timing controls for the various components may use any desired technology including conventional wired control, computer processing systems and combinations thereof. The required control system is thus readily provided by those skilled in the art of bag machine controls and controls generally no further description is believed necessary.

More particularly, as shown in the enlarged view of FIGS. 4 and 5, the tube 29 is provided with a series of jet openings or nozzles 32 which extend through the plate 20 and the tube 29. The nozzles 32 are oriented to establish a pressurized stream 18 generally parallel to the upper face of the lip 23 and directing the air stream substantially as shown into the gap between the seal bar 14 and the anvil 13. The pressurized stream 18 wipes the new severed leading edge of web 2 from the bar tip 15 and holds the same to the anvil.

The characteristic of the stream 18 is preferably varied to accommodate the structure of the web such as the lipped web 2. The single layer lip 2b should be carefully monitored or controlled to prevent the fold back of the lip under the high acceleration and speed to prevent creation of "dog ear" portions in the final bag. Thus, a suitable member of different shaped, sized or oriented openings ass shown in FIG. 4, as four larger holes 32a, are illustrated which will be aligned with the lip portion of the web 2. The stream 18 aligned with the web is thereby specially designed to prevent such a fold back.

Applicant has found that the present invention provides a highly effective method in which an angled air stream wipes across the tip of the seal bar as it is withdrawn following the seal period to positively remove the free formed end of the web 2 from the seal bar, directs the leading edge of the severed web 2 and prevents it from folding upward, eliminating the folded lip 26 of the bag 4 from welding onto itself. In summary, the illustrated embodiment promotes the optimal desired movement of the web during the immediately following operation of the draw rolls into optimal positioning of the web within the seal bar gap for forming of the next bag. The system provides very satisfactory operation at much faster operating speeds.

The inventors have also anticipated providing a further air stream 35 immediately upstream of the sealing roller and beneath the plane of the web 2. A suitable air tube 36 is illustrated in FIG. 3. Air tube 36 may be coupled to the air supply 31 and operated in synchronism with the activation of the stripper air stream 18, or may be provided with a separate supply timing control. The air stream 35 is directed to flow over the upper end of the sealing roller 13 and further promote release of the web 2 during the forward movement of the web 2 and thereby assist in the establishing rapid acceleration and high speed movement of the web 2 through and into position within the seal bar unit.

Although shown in a preferred construction incorporated into the standard or the presently known cooling plate, any other system can be employed. Thus, as diagrammatically shown in FIG. 6 with elements corresponding to the elements of the first embodiment identified by the corresponding primed number, a separate air tube 29', which may be independent of the plate 20' is mounted across the width of the machine to generate an air blast 18' across the seal bar, generally in the direction of the web flow. The tube 29' can be connected to the pulsed source 31' of air, which may or may not be cooled. If cooled, the source air may be cooled or the tube may have its own internal constructed cooling structure such as a water cooling jacket, not shown. In this embodiment, the tube 29' is shown as a separate tube located generally below the lip of the conventional cooling plate and illustrates the concept of a completely separate air source or unit for establishing appropriate air blasts across the gap to positively remove the web from the seal bar and hold the leading edge of the web to the anvil and particularly in the plane of web movement.

The present invention with the separate stream source permits the multiple holes or nozzles to be relatively closely spaced across the total width of the seal bar unit. This is in contrast to the conventional air fingers which require certain minimum tubular dimensions. If air fingers are constructed with close spacement such as permitted with the present teaching, significantly enlarged grooves in the draw rolls would further reduce the available roll surface and the drive traction on the web.

Another advantage of the illustrated embodiments as well as the basic teaching of the invention provides a very simple system in which the stream characteristic or size can be varied such as to accommodate a radically large change in the film properties or the like. Individual cooling units may be provided each having an arrangement for use with a particular web. Alternatively, the special air blast tube or other unit providing the stream 18 may be releasably secured to the plate element rather than being formed as an integrated part thereof. Thus, tube 29' may be readily formed as an appropriate clip-on device, with a clip unit 38 shown in FIG. 6.

In addition, it may be desirable to selectively close portions or groups of the holes or nozzles 32 with the new release and control air stream method and apparatus. This can be readily provided for through simple structures. For example, as shown in phantom in FIG. 5, a plate member 37, or members, may be selectively attached to the plate 20 with one or more of the air holes or nozzles 32 covered to interrupt a portion of a stream 18.

Each of the two improvements including the teaching concept of the air stripping and guide stream 18, such as illustrated in the preferred embodiment by tube 17, and the second sealing roller release air tube to provide a floating of the web may, of course, be independently used with other plastic web processing machines.

In addition, although present units have employed some guide members within the draw rolls, the superior action of the air stream control has permitted certain modifications with respect to the guide members within the draw rolls and may well permit effective removal of such members or at least significant reductions in connection therewith. The particular construction and specific location of the elements of the illustrated embodiment and location thereof may vary with any further changes in speed characteristics as well as the characteristics of the plastic or flexible materials used. Thus, the thickness as well as the particular plastics may all effect the overall operation of a system and require specific adaptation of the present invention to the particular materials, speeds and the like, all of which can be readily provided by those skilled in the art based on present application of bag making machines to particular design specifications.

Thus, the present invention is particularly directed to the generating of a cooled fluid supply, preferably air, which is directed directly downwardly and across the tip of a seal bar to blow the leading edge of the web away from the seal bar. The jet is created across the end of the seal bar and preferably at an angle to direct the stream downwardly toward the film structure for a short period during the release of the seal bar and during the initial high speed advance of the web into the gap of the seal bar unit so as to permit the unobstructed flow of the film web into the gap without curling of the film web during the high speed advance required or desired in present day bag forming machines and the like.

Although particularly applied to a bag forming machine, it can of course be applied to any other flexible web elements which are to be successively sequentially formed into individual elements by passing through a hot sealing and/or cutting mechanism such as disclosed.

Although the inventors have not to date completed all of the various analysis and testing of a bag machine for all of the different characteristics and film and plastics which are presently used in bag making machines or the various bag configurations, such testing and modifications and adjustments of the illustrated embodiment can be readily provided by those skilled in the art based on the teaching presented herein. Further, as noted previously, the basic concept of the present invention is the air stream provided immediately upstream of the seal bar unit to provide the optimal control of the leading edge for movement at high cycle rates through the processing machine. The air stream source can take many different forms and structures other than those particularly illustrated herein within the teaching of the present invention.

Thus, the size of the air stream, the particular angle of incidence with respect to the seal bar and/or web 2, the formation of the multiple holes or nozzles and like structure and control may vary within the teaching of the present invention.

Various modes of carrying out the invention are contemplated as being within the scope of the following claims particularly pointing out and distinctly claiming the subject matter which is regarded as the invention.

We claim:

1. A film web control apparatus for stabilizing the leading edge of plastic web in a seal bar unit having a reciprocating element, said element having a heated tip adapted to engage said web and sever a portion therefrom, comprising a cooling plate unit adapted to be mounted adjacent said seal bar unit and having a cooling source coupled thereto, said plate unit having a bottom end located immediately above the web path, said plate unit having an elongated fluid passageway unit at the lower end of said plate, said passageway having a plurality of discharge openings directed outwardly therefrom and directed across the path of said heating element immediately above the web plane for directing a fluid stream over the heated tips and engaging web to prevent operative lifting of the leading edge of the severed web.

2. The control apparatus of claim 1 wherein said plate unit comprises a metal plate having a bottom lip extended in the direction of said discharge openings, said passageway unit including a tube adapted to be connected to an air supply, said plate and tube having a plurality of spaced common openings forming said discharge openings.

3. The apparatus of claim 2 wherein said common openings have a diameter on the order of 3/16 inches.

4. A stripping system for removal of a plastic web from a heated severing element in a side weld bag forming machine having a draw roll unit located immediately upstream of said severing element, comprising an elongated passageway unit mounted adjacent the upstream side of said severing element and the downstream side of said draw roll unit, said passageway unit including a discharge passageway establishing a fluid stream directed at a downward angle through the path of said severing element immediately above said web path, said fluid stream being established during the raising of the severing element from said web to engage the severing element and the web to effectively prevent lifting of the web.

5. In a bag forming machine moving a plastic web through a seal bar unit having a heated seal bar with an engaging end for severing the web to form individual plastic elements from the leading edge of the plastic web, a web control apparatus comprising a fluid stream unit located immediately upstream of the seal bar establishing a fluid stream across and downwardly of the engaging end of the heated seal bar to engage the heated seal bar and prevent substantial upward movement of the web and thereby maintain the web in position for movement through said seal bar unit.

6. In the bag forming machine of claim 5 wherein said fluid stream unit consists of an elongated passageway member located above the plane of the web.

7. In the bag forming machine of claim 6 wherein said elongated passageway member includes a tube having a plurality of closely spaced nozzle openings to create a plurality of individual spaced streams engaging said web.

8. An apparatus for forming successive plastic members from a plastic web, comprising a severing unit including a reciprocating member having a heated tip and an opposed anvil, a draw roll unit located upstream of said knife unit for moving the web into said knife unit for severing the web and forming the successive plastic members, a cooling unit mounted between the knife unit and the draw roll unit, and an air stream jet unit coupled to said cooling unit and having an air outlet establishing an air stream directed through the severing unit for engaging the heated tip and positively removing the severed web end from the heated tip and holding the web against the web.

9. The apparatus of claim 8 including said draw rolls coupled to the web upstream of said cooling unit, a drive for said drive rolls activated after removal of said air stream.

10. The apparatus of claim 8 wherein said air stream has a pressure in the range of 20 to 40 psi.

11. The apparatus of claim 8 wherein said knife unit includes a sealing roller aligned with said heated tip and located below and in supporting engagement with said web, and an air release unit located immediately upstream of said sealing roller and establishing an air flow over the roller to support the moving web.

12. The bag forming machine of claim 4 including a draw roll unit mounted upstream of said seal bar unit, said draw roll unit including a plurality of axially spaced draw roll segments mounted on a common axis and simultaneously and correspondingly rotated to engage said web and move said web into said seal bar unit, said draw roll segments being spaced from each other to form narrow grooves therebetween, mechanical stripper members mounted above and below the path of said web and located passing through said grooves between said draw roll segments and serving to positively strip the web from the draw roll segments and prevent the web from moving upwardly and downwardly onto the respective draw roll segments.

13. The apparatus of claim 8 wherein said draw roll unit includes an elongated draw roll including a plurality of closed spaced individual draw rolls rotatably mounted for simultaneous rotation and grasping of the web for moving of the web, and a plurality of mechanical stripper members located within at least some of the grooves between the individual draw roll segments and serving to positively hold the web and prevent movement of the web upwardly or downwardly onto the draw rolls and thereby direct the web into the seal bar unit.

14. In an apparatus for forming successive plastic members from a plastic web, comprising:

a severing unit including a vertically reciprocating member having a heated tip and an opposed anvil, a draw roll unit located upstream of said knife unit for moving the web into said knife unit and for severing the web and forming the successive plastic members, and a separate air stream jet unit mounted between and spaced from said severing unit and said draw roll unit and having an air outlet establishing an air stream directed through the severing unit and engaging the heated tip and positively removing the severed web end from the heated tip and preventing substantially upward movement with the heated tip.

15. In the apparatus of claim 14 wherein said draw roll unit includes a plurality of closed spaced individual draw roll segments separated by narrow grooves and rotatably mounted for simultaneous rotation and grasping of the web for moving of the web, and a plurality of mechanical stripper members located within at least some of the grooves between the individual draw roll segments and serving to positively hold the web and prevent movement of the web upwardly or downwardly onto the draw rolls and thereby direct the web into the seal bar unit.

16. The apparatus of claim 15 wherein said mechanical stripper members are each a plate having an outer end located beneath and substantially aligned with said separate air stream jet unit.

* * * * *